United States Patent
Boyer et al.

(10) Patent No.: US 10,956,824 B2
(45) Date of Patent: Mar. 23, 2021

(54) PERFORMANCE OF TIME INTENSIVE QUESTION PROCESSING IN A COGNITIVE SYSTEM

(71) Applicant: International Business Machines Corporation, Armonk, NY (US)

(72) Inventors: John M. Boyer, Victoria (CA); Bryan J. Kyle, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 15/372,476

(22) Filed: Dec. 8, 2016

(65) Prior Publication Data

US 2018/0165580 A1 Jun. 14, 2018

(51) Int. Cl.
*G06N 5/04* (2006.01)
*G06F 16/00* (2019.01)

(52) U.S. Cl.
CPC .............. *G06N 5/04* (2013.01); *G06F 16/00* (2019.01)

(58) Field of Classification Search
CPC ................................. G06N 5/04; G06F 16/00
See application file for complete search history.

(56) References Cited

U.S. PATENT DOCUMENTS

| | | |
|---|---|---|
| 8,122,026 B1 | 2/2012 | Laroco, Jr. et al. |
| 8,275,803 B2 | 9/2012 | Brown et al. |
| 8,442,923 B2 * | 5/2013 | Gross ..................... G06Q 30/00 706/12 |
| 8,788,498 B2 | 7/2014 | Kannan et al. |
| 8,943,017 B2 | 1/2015 | Fraleigh et al. |
| 2007/0282874 A1 | 12/2007 | Metcalfe |
| 2008/0104065 A1* | 5/2008 | Agarwal ................ G06Q 10/10 |
| 2008/0270384 A1 | 10/2008 | Tak |
| 2009/0287678 A1 | 11/2009 | Brown et al. |
| 2011/0066587 A1 | 3/2011 | Ferrucci et al. |

(Continued)

OTHER PUBLICATIONS

Mao et al., "FAQ Auto Constructing Based on Clustering," in 1 2012 Intl. Conf. Comp. Science and Electronics Engineering 468-472 (2012). (Year: 2012).*

(Continued)

*Primary Examiner* — Kamran Afshar
*Assistant Examiner* — Ryan C Vaughn
(74) *Attorney, Agent, or Firm* — Stephen J. Walder, Jr.; Diana R. Gerhardt

(57) ABSTRACT

Mechanisms are provided for performing watched question processing. The mechanisms detect a change in content of electronic documents in a corpus of electronic documents, and retrieve a watched question from a watched question database. The mechanisms determine whether full processing of the watched question through the question answering pipeline is to be bypassed when performing watched question processing in response to the detected change in content of the electronic documents in the corpus. The mechanisms bypass one or more stages of processing of the question answering pipeline in response to determining that full processing of the watched question through the question answering pipeline is to be bypassed. The mechanisms return a result of the watched question processing indicating that no changes to the previously generated answers are caused by the change in the content of the electronic documents in the corpus.

17 Claims, 5 Drawing Sheets

(56) References Cited

U.S. PATENT DOCUMENTS

| | | | |
|---|---|---|---|
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0262501 A1 | 10/2013 | Kuchmann-Beauger et al. | |
| 2014/0172883 A1* | 6/2014 | Clark | G06N 5/022 707/749 |
| 2014/0317104 A1* | 10/2014 | Isaacs | G06F 16/332 707/728 |
| 2015/0293917 A1* | 10/2015 | Bufe, III | G06F 16/24578 706/12 |
| 2016/0110459 A1* | 4/2016 | Jamrog | G06F 16/3329 707/723 |
| 2017/0124475 A1* | 5/2017 | Anderson | G06N 5/045 |
| 2017/0230387 A1* | 8/2017 | Srinivasan | G06F 16/35 |
| 2017/0372190 A1* | 12/2017 | Bishop | G06F 17/278 |
| 2018/0025274 A1* | 1/2018 | Beller | G06N 5/04 706/46 |
| 2018/0081627 A1* | 3/2018 | Bajekal | G06F 7/24 |

OTHER PUBLICATIONS

High, Rob, "The Era of Cognitive Systems: An Inside Look at IBM Watson and How it Works", IBM Corporation, Redbooks, Dec. 12, 2012, 16 pages.

Hirschman, L. et al., "Natural language question answering: the view from here", Natural Language Engineering 7 (4): 275-300, Dec. 2001, pp. 275-300.

McCord, M.C. et al., "Deep parsing in Watson", IBM J. Res. & Dev. vol. 56 No. 3/4 Paper 3, May/Jul. 2012, pp. 3:1-3:15.

Pasca, Marius, "Open-Domain Question Answering from Large Text Collections", Computation Linguistics 29,.4 (2003), Apr. 15, 2003, pp. 665-667.

Quarteroni, Silvia et al., "User Modelling for Personalized Question Answering", Congress of the Italian Association for Artificial Intelligence, Sep. 10-13, 2007, 12 pages.

Tan, P.S. et al., "Context-enabled B2B Collaborations", IEEE International Conference on Services Computing (SCC 2007), Jul. 9-13, 2007, 4 pages.

Tanter, Eric et al., "Partial Behavioral Reflection: Spatial and Temporal Selection of Reification", Proceedings of the 18th annual ACM SIGPLAN conference on Object-oriented programing, systems, languages, and applications (OOPSLA'03), Oct. 26-30, 2003, 20 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

PERFORMANCE OF TIME INTENSIVE QUESTION PROCESSING IN A COGNITIVE SYSTEM

BACKGROUND

The present application relates generally to an improved data processing apparatus and method and more specifically to mechanisms for improving performance of time intensive question processing in a cognitive system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples of QA systems are Sin® from Apple®, Cortana® from Microsoft®, and the question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which are executed by the processor to cause the processor to implement the method. The method comprises detecting, by the data processing system, a change in content of electronic documents in a corpus of electronic documents, and retrieving, by the data processing system, a watched question from a watched question database. The watched question is a question previously processed by a question answering pipeline of the data processing system and for which monitoring is performed to identify changes to previously generated answers for the watched question. The method also comprises determining, by the data processing system, whether full processing of the watched question through the question answering pipeline is to be bypassed when performing watched question processing in response to the detected change in content of the electronic documents in the corpus. In addition, the method comprises bypassing, by the data processing system, one or more stages of processing of the question answering pipeline in response to determining that full processing of the watched question through the question answering pipeline is to be bypassed. Moreover, the method comprises returning, by the data processing system, a result of the watched question processing indicating that no changes to the previously generated answers are caused by the change in the content of the electronic documents in the corpus.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
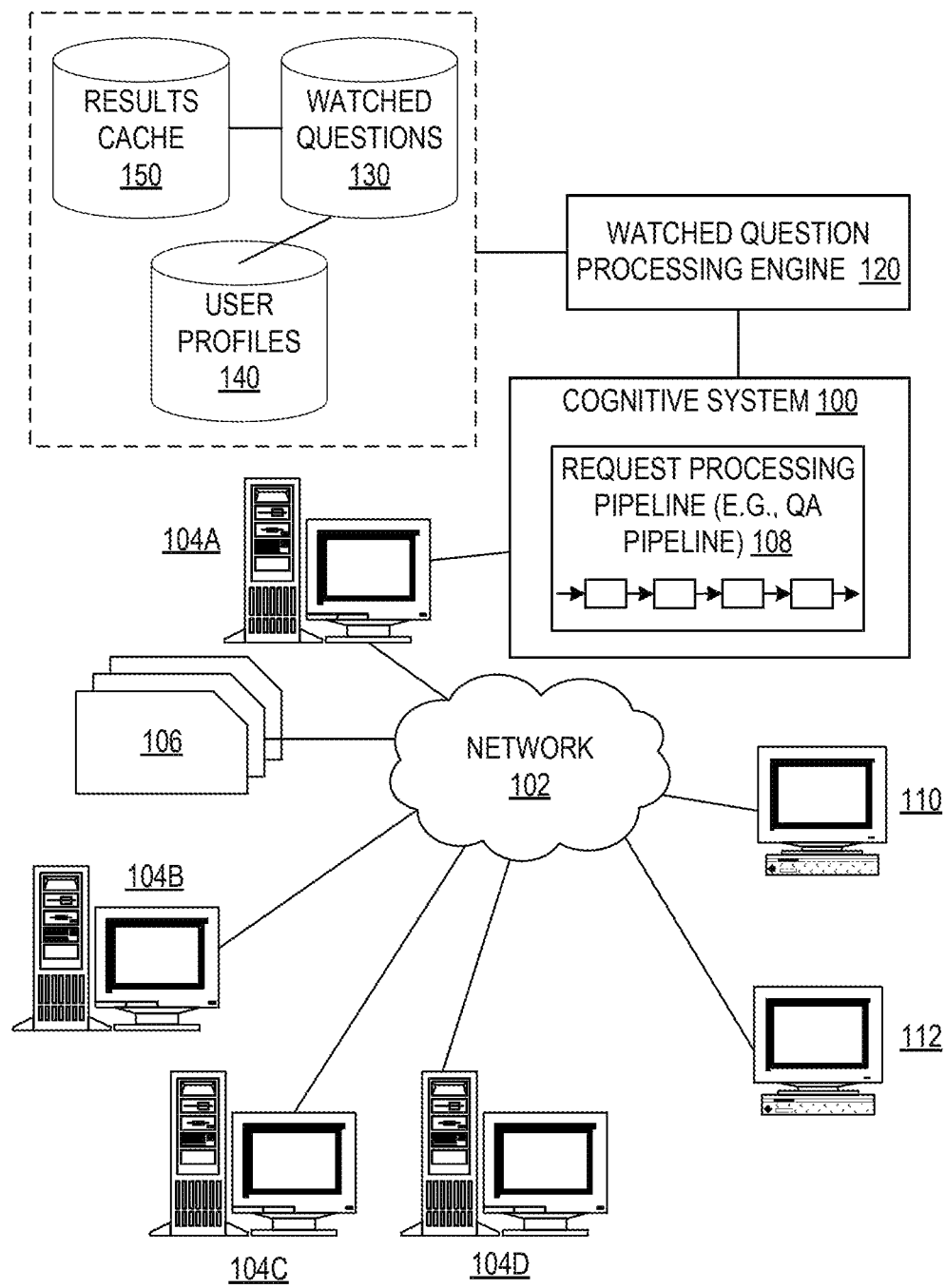
FIG. 1 depicts a schematic diagram of one illustrative embodiment of a cognitive system, operating in conjunction with a watched question processing engine, in a computer network.

A natural language cognitive advisor is a computer based solution, referred to herein as a cognitive system, that applies natural language processing techniques to large volumes of unstructured information, e.g., a corpus or a plurality of corpora of unstructured documents, to help answer questions of interest to end-users. One functional challenge of such cognitive systems is that new information may be incrementally added to the corpus or corpora which may change the answers previously presented to submitted questions. The cadence of corpus updating may be course grain, such as monthly or weekly, or it may be fine grain, such as daily, hourly, or multiple times per hour. This leads to a concern regarding the updating of answers to questions that were previously processed by the cognitive system as those answers may change due to the updates to the corpus or corpora.

Once the functional challenge of incremental corpus updating is addressed, end-users immediately want a user experience beyond the ephemeral, stateless question answer paradigm. For the cognitive system to be more useful in their daily work, not only does the corpus need to be up-to-date, but the user experience must support the notion that each end-user may have questions of ongoing interest to them. Rather than having to manually reenter these questions every time the corpus is updated, the cognitive system can offer each user the capability to specify watched questions for which the N top ranked answers generated by the cognitive system may be monitored, where N is any integer number desired by the specific implementation e.g., the top 10 ranked answers may be monitored.

A watched question, in this context, is a query in any format supported by the cognitive system, which is automatically monitored for any N top answers that change based on an update to the corpus or corpora. The watched question may be expressed in natural language or in a query format. The watched question format may also include any filters, such as the date of the information source, as discussed hereafter. The watched question may also include other metadata, such as synonyms or disambiguated forms of the watched question or terms within the watched question. For a given watched question, if a new answer is present in the N top answers, then the user associated with the watched question may be notified of the new answer. Similarly, if new supporting evidence for an existing answer in the N top answers changes, then the user may be notified in implementations where the cognitive system supports providing supporting evidence passages for answers to the user.

Supporting watched question functionality in a cognitive system represents a computational load problem for the cognitive system. To exemplify the problem, in some cognitive systems, each watched question may take between 10-15 seconds of processing time to evaluate each time there is an update to the corpus or corpora, or when periodically executed. As usage of the cognitive system increases, the processing time for all watched questions from all users can exceed the time window between corpus updates even at peak capacity of the budgeted infrastructure.

While adding more processing cores to provide more processing capabilities to handle the load and/or scaling up the number of threads submitting watched questions to run more queries in parallel may allow for a decrease in the processing time by brute force methods, such solutions are only effective to the extent that they fit within the user's financial budget to provide such computing power. Moreover, while one could limit the number of watched questions that a user may maintain, this approach becomes impractical as it is not scalable across computer functions of a cloud solution and the growth of the user base would impose increased limitations on the users that would eventually conflict with the watched questions they may have already created. Moreover, the amount of compute power required per watched question can vary dramatically such that it may be very difficult to characterize the per-user limitations on watched questions. Thus, it would be beneficial to provide a solution that optimizes processing of watched questions so as to reduce the amount of time required to perform the processing of such watched questions.

The illustrative embodiments provide mechanisms for improving performance of time intensive question processing in a cognitive system. The mechanisms of the illustrative embodiments operate based on the difference between question answering on an updated corpus or corpora versus watched question answer updating based on a corpus/corpora update. For a given watched question, a comparative analysis of at least one particular stage of a cognitive system pipeline under two invocations is performed. One invocation includes the entire (or "full") corpus/corpora, which for ease of explanation herein will be assumed to be a single corpus although the mechanisms of the illustrative embodiments may be applied to multiple corpora. The second invocation excludes the updated portions of the corpus/corpora. The comparison of the two invocations indicates whether or not it is necessary to execute certain more costly downstream operations of the cognitive system pipeline or if such operations may be bypassed. As a result, the processing load of watched questions is effectively reduced, which mitigates the possibility of reaching a compute power budget limit or a functionally expressed limit for watched question processing.

In a first aspect of the illustrative embodiments, a primary search phase of the cognitive system pipeline is optimized by determining whether a primary search on a set of key terms/phrases and/or other features extracted from a watched question returns a different set of M highest ranked documents (or passages of content) in the corpus (e.g., documents) between when the updated documents in the corpus (referred to as corpus update documents) are included, i.e. the "full" corpus invocation, and when they are excluded, where M is again an integer number determined based on the desired implementation. For example, assume that R1 denotes the list of primary search results from the corpus prior to the corpus updates being applied, i.e. excluding corpus update documents, and R2 denotes the list of primary search results from the full corpus including the corpus update documents. Since the candidate answers are obtained from the M highest ranked documents of the primary search, if R2 is equal to R1, then the processing of the watched question can be concluded because there will be no change to the answers, i.e. the M highest ranked documents have not changed and thus, the N top ranked answers will not change. Thus, even though a change has been made to the corpus, there is no need to perform full evaluation of the watched question through the entire cognitive system pipeline since the result will not change, i.e. the same top N answers will be returned. As a result, candidate answer generation, scoring, merging, ranking, and supporting evidence gathering for the watched question may be avoided and the processing time and resources that would have been used for such operations may be saved.

As a further optimization that may be applied in some illustrative embodiments, date filtering mechanisms may be provided to distinguish pre-existing portions of the corpus from corpus updates based on date or date/time filtering. That is, any portions of the corpus that have ingestion date/time metadata associated with them that are prior to a last corpus update date/time will be considered to be pre-existing portions of the corpus while other portions of the corpus that have ingestion date/time metadata that are equal to or after the last corpus update date/time will be considered new portions of the corpus, for purposes of identifying R1 and R2 above. Hereafter, for purposes of explanation, it will be assumed that the portion of the corpus is a "document," where a document may be any size portion of unstructured content, e.g., natural language content, in the corpus, e.g., a single sentence, paragraph, passage of multiple paragraphs, multiple passages, websites, instant messages, or any other size portion of unstructured content.

As another optimization that may be applied in some illustrative embodiments, a post-processing operation may be provided for watched question processing that assigns a metadata facet "X" with a value indicative of whether or not the portion of the corpus is a previously existing portion of the corpus, i.e. X=EXISTING. During watched question processing, all pre-existing corpus documents will have a facet X value of EXISTING, and all newly ingested corpus update documents will not have this facet X value, e.g., X may be set to 1 if it is EXISTING and X may be set to 0 if it is not EXISTING. Thus, R1 may be associated with documents of the corpus whose X value is EXISTING while R2 is produced from all of the documents regardless of X value. The facet optimization provides a similar result to the date/time filtering optimization noted above, however, the faceting optimization may be able to be performed more quickly than the filtering as it may require fewer processing operations to perform.

A further optimization that may be applied in some illustrative embodiments is the use of a result list cache and caching methodology that may be implemented in the logic of the cognitive system. That is, in one illustrative embodiment, the cached results obtained by a previous invocation of R2 prior to a corpus update may be utilized in lieu of directly invoking the primary search to obtain R1, i.e. the M highest ranked documents generated as a result of processing the watched question on the corpus prior to the update to the corpus. Furthermore, when a primary search result for R2 comprising the full corpus (pre-existing documents and corpus update documents) is found to be different than the primary search result for R1 comprising only the pre-existing documents prior to the corpus update, then the results for R2 may be used to update the cached results for R1 for that watched question. Then, when the watched question is being evaluated during a future corpus update, the updated cached primary search results are used in lieu of performing the R1 primary search that excludes the corpus update documents.

In still a further optimization that may be implemented in some illustrative embodiments, watched question pooling mechanisms may be provided in the cognitive system logic. In particular, for each watched question, important features, e.g., key words, key phrases, lexical answer types, focus, etc., that are extracted during question parsing and analysis may be cached as metadata for the watched question. Watched questions across users that have similar extracted features for the primary search, i.e. similar questions being asked by a plurality of different users, may be associated with each other in a same watched question pool such that the primary search for watched question processing may be performed once for each watched question pool, rather than for each watched question, and the results being applied to each watched question in the watched question pool. Thus, a reduction in the amount of processing needed is achieved where the amount of the reduction depends on the size of the watched question pool, e.g., if the watched question pool comprises 100 similar watched questions across multiple users, then a 99% reduction in processing required to perform the primary search for watched questions in the watched question pool is achieved by performing the primary search only once rather than 100 times. It is important to note, though, that if the R1 and R2 results differ for a watched question pool, then each watched question in that watched question pool must be reevaluated by the cognitive system pipeline since each may differ in features that affect stages after the primary search.

In yet another optimization that may be applied in some illustrative embodiments, an update constrained analysis may be implemented in the cognitive system logic, such that that a preliminary search that is constrained to only corpus update documents is performed. For example, a modified form of the faceting mechanisms previous previously described may be used to identify the portions of the corpus that are directed to corpus update documents. In such a case, the facet X for a corpus update document may be set to a NEW value during an initial ingestion and then changed to a value of EXISTING after watched question processing is performed after the ingestion. If the preliminary search of only the corpus update documents produces no results, then the optimized primary search phase, as discussed in the illustrative embodiments above, may be bypassed along with the rest of the processing by the additional downstream stages of the cognitive system pipeline. This bypass is appropriate because the updates to the corpus did not contain any documents that would add to the results of R2 above, i.e., primary search on a full corpus, relative to the results of R1, i.e., a primary search that excludes the corpus update documents.

In some illustrative embodiments, alternative to, or in addition to, one or more of the primary search mechanisms described above, mechanisms are provided for optimizing candidate answer generation. For example, assume that A1 denotes the candidate answer list prior to, or exclusive of, corpus update documents, and A2 denotes the candidate answer list generated from the full corpus including the corpus update documents. If A2 does not differ from A1 for a given watched question, then the remaining stages of the cognitive system pipeline, e.g., scoring, merging, ranking, and supporting evidence gathering, can be bypassed since the candidate answers have not changed based on the corpus update.

It should also be appreciated that mechanisms similar to those above with regard to the primary search optimizations may be applied to embodiments in which candidate answer generation is optimized as well. For example, result list caching may be utilized such that A1 can be obtained from a cache and when A2 differs from A1, then A2 can be used to update the cached A1. For another example, watched question pooling may be performed based on similarity of question features used as input to candidate answer generation.

As another example, update constrained analysis as discussed above may also be used with candidate answer generation optimization. Specifically, the primary search phase may be constrained to corpus update documents only. Then, if there are no documents produced or if there are no candidate answers generated from any documents produced by the primary search, then the optimized candidate answer generation may be bypassed along with the remaining downstream stages of the cognitive system pipeline processing for watched questions because the corpus update did not contain any documents that would add candidate answers to A2 relative to A1.

In still other illustrative embodiments, the above processing of watched questions may also be modified based on cognitive system pipeline component version updates. For example, if an annotator, scoring algorithm, ranking algorithm, trained model, or any other component of the cognitive system pipeline changes that would affect the way in which candidate answers to watched questions may be generated, the final N top ranked answers produced based on a full corpus may differ from the final N top ranked answers produced from the corpus excluding corpus update documents, even if the results of the primary search did not change, i.e. R2 equals R1, or the results of the candidate answer generation did not change, i.e. A2 equals A1. When a component of the cognitive system pipeline component is detected to have been updated or changed in any way, the R1 and A1 caches may be cleared so as to require a full processing of the watched questions by the cognitive system pipeline. Furthermore, depending on what question analysis metadata have been stored for each watched question, the stored metadata for watched questions may also be recomputed if an updated version of a question analysis component has been deployed.

Thus, the illustrative embodiments provide a variety of mechanisms for identifying situations where full processing of watched questions by a cognitive system pipeline is not needed due to the candidate answers not changing. In addition, mechanisms are provided for constraining the analysis performed for determining whether full processing of the watched question is needed for only those portions of the corpus that have been changed since a last processing of the watched question. In addition, mechanisms are provided for watched question pooling that pools similar watched questions together so as to reduce processing of watched questions to a single processing per watched question pool. Moreover, mechanisms are provided for determining when changes to the underlying logic of the cognitive system pipeline itself has changed so as to require full processing of watched questions. All of these mechanisms, individually or combined in various combinations, operate to reduce the time and resources needed to check for changes in answers to watched questions due to updates to a corpus or corpora. As a result, the watched question processing is made more efficient and less of a burden on the cognitive system to accomplish. Moreover, due to the large reduction in watched question processing time and resources, larger numbers of users and/or watched question sets per user may be accommodated.

It should be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk®, C++® or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for improving performance of time intensive question processing in a cognitive system. The mechanisms improve the operation of a cognitive system by providing mechanisms for determining whether or not processing time and resources of the cognitive system may be conserved when processing watched questions previously processed by the cognitive system and for which one or more previous answers have been generated. In the case that the mechanisms determine that processing time and resources may be conserved, full processing of the watched questions by the cognitive system may be bypassed. It should be appreciated that "full" processing of a watched question means a processing of the watched question from a first stage to a final stage at which one or more answers to the watched question are generated, is performed. The mechanisms of the illustrative embodiments may bypass one or more stages of processing by the cognitive system when it is determined that full processing is not required for a watched question.

Figure 2:
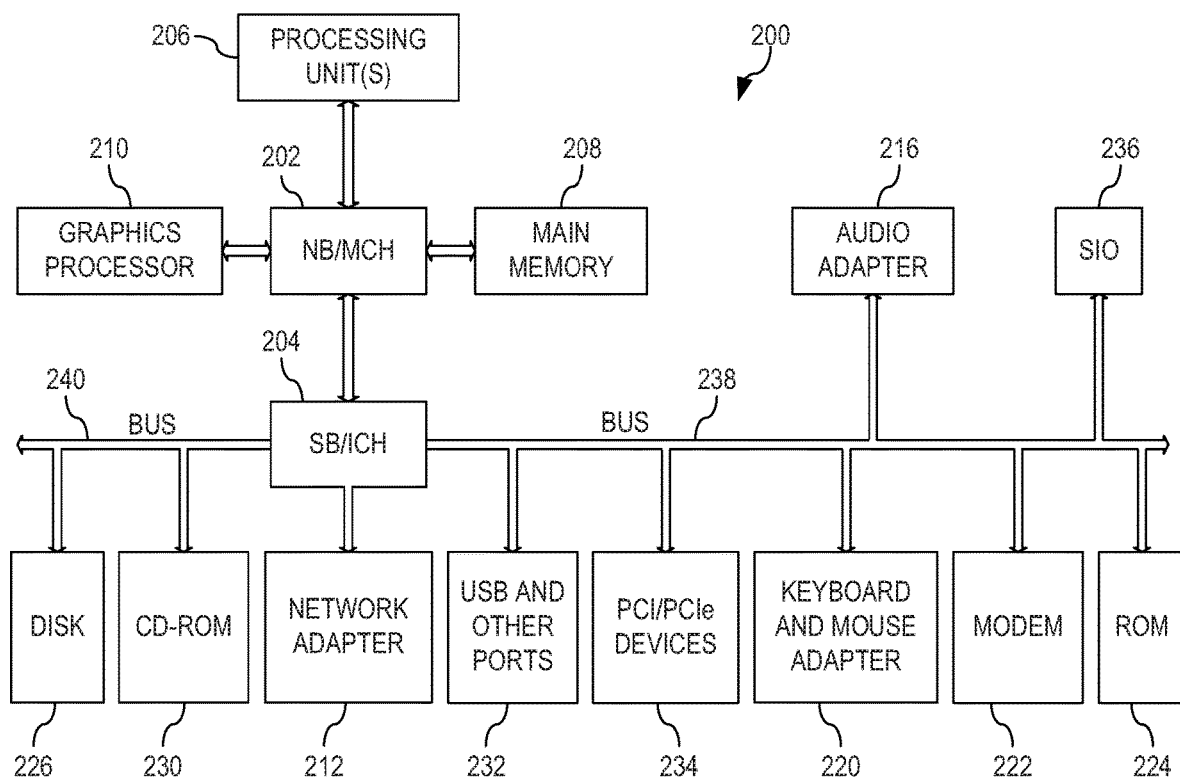
FIG. 2 is a block diagram of an example data processing system in which aspects of the illustrative embodiments are implemented.
Figure 3:
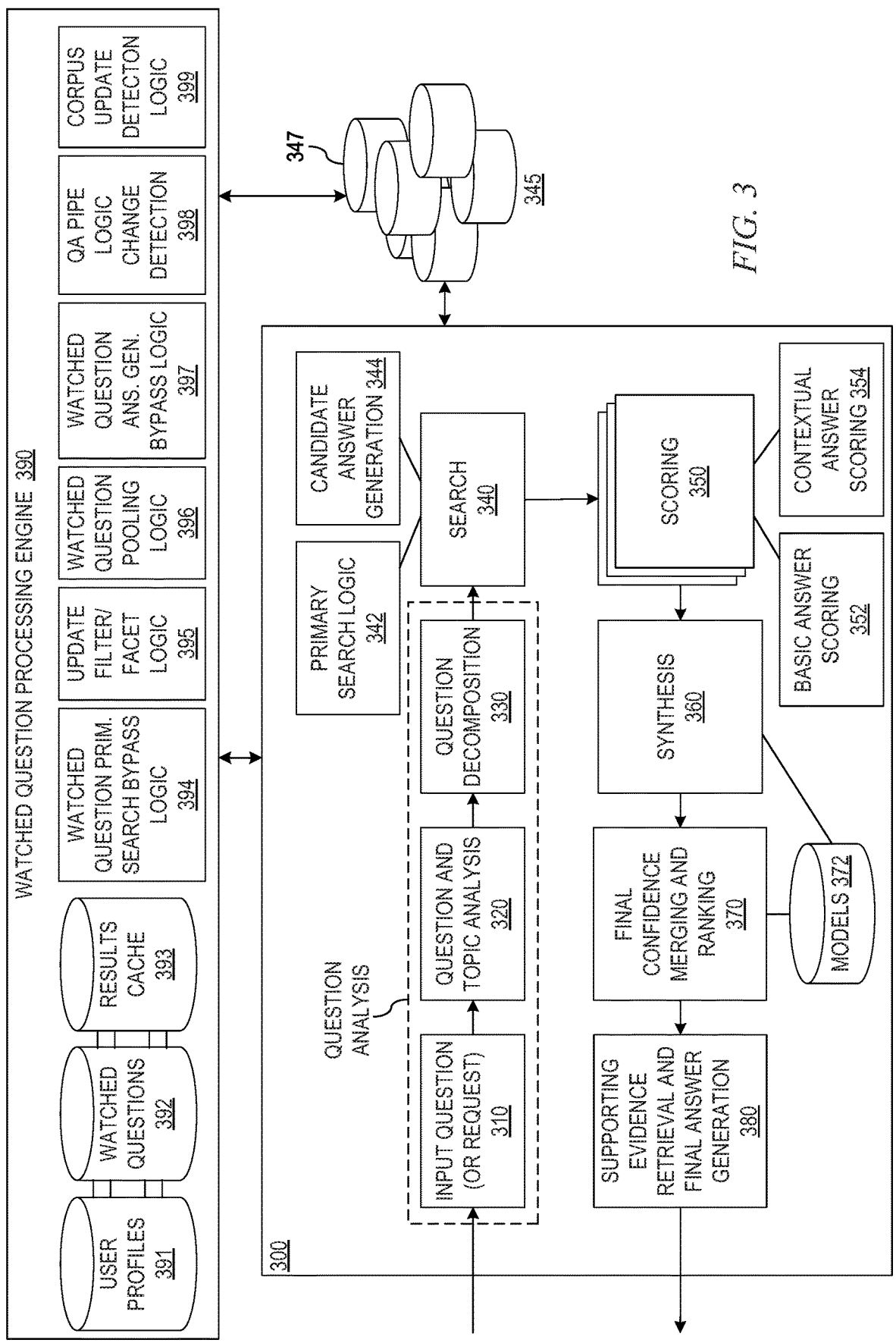
FIG. 3 illustrates a cognitive system processing pipeline for processing a natural language input to generate a response or result in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for performing structured or unstructured question/request processing which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. As described in more detail hereafter, the particular application that is implemented in the cognitive system of the present invention is an application for question answering in which watched question processing functionality is provided as described previously.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a medical domain while a second request processing pipeline may be directed to a financial domain. In other cases, for example, the request processing pipelines may be configured to provide different types of cognitive functions or support different types of applications, such as one request processing pipeline being used for answering questions, a second request processing pipeline being used to generate medical treatment recommendations, a third processing pipeline being used to provide cognitive search results, etc.

Moreover, each request processing pipeline may have its own associated corpus or corpora that it ingests and on which it operates, e.g., one corpus for medical domain documents and another corpus for financial domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?" the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms of a cognitive system with regard to watched question processing. In particular, the mechanisms of the illustrative embodiments operate to determine when full processing of watched questions may be bypassed due to changes in the corpus/corpora not changing the resulting one or more candidate answers associated with the watched question from a previous processing of the watched question. Moreover, the mechanisms of the illustrative embodiments provide for watched question pooling such that a single processing of a watched question may be performed for an entire group of similar watched questions.

Since the mechanisms of the illustrative embodiments provide functionality to improve the operation of a cognitive system implementing question answering cognitive functions, it is important to first have an understanding of how cognitive systems, and question and answer creation in a cognitive system implementing a QA pipeline, are implemented before describing how the mechanisms of the illustrative embodiments are integrated in and augment such cognitive systems and request processing pipeline, or QA pipeline, mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson® is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding Ingest and process vast amounts of structured and unstructured data Generate and evaluate hypotheses Weigh and evaluate responses that are based only on relevant evidence Provide situation-specific advice, insights, and guidance Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimics human cognition based on experiences Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of these data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate but which may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, subsystems, and/or devices other than those that are depicted herein.

The cognitive system 100 is configured to implement a request processing pipeline 108 that receives inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is repeated for each of the candidate answers to generate a ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and provide a result of the cognitive analysis.

In the context of the present invention, cognitive system 100 may provide a cognitive functionality for processing watched questions in which mechanisms are provided for determining whether or not full processing of a watched question by the QA pipeline is required or not. For example, depending upon the particular implementation, the mechanisms of the illustrative embodiments automatically determine when a change to a corpus or corpora has occurred and then automatically initiates watched question processing. As part of the watched question processing, determinations are made as to whether or not the updates to the corpus or corpora materially affect the candidate answers and/or final answer previously generated for the watched questions. If so, then full processing of the watched question is performed. If not, then full processing of the watched question may be bypassed so as to conserve processing time and resources with regard to the watched question. Moreover, pooling of watched questions may be performed to provide even greater processing time and resource conservation. In addition, the watched question processing may comprise automatic detection of changes to logic of the QA pipeline itself which would require full processing of all watched questions.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a watched question processing engine 120. A user of the cognitive system 100 may submit a question to the cognitive system 100 for processing by the request processing pipeline 108, which for purposes of the following discussion will be considered to be a QA pipeline 108 that processes natural language questions and generates one or more answers to the natural language question based on analysis of a corpus, such as corpus 106, which is then returned to the user that submitted the question, e.g., via their client computing device 100 and network 102. In addition, the user may designate with the cognitive system 100 that a particular question submitted to the cognitive system 100 should be considered a watched question, meaning that the cognitive system 100 is to monitor changes to the corpus 106 and when the corpus 106 changes, determine whether the answer(s) to the watched question has changed based on the change to the corpus 106. Alternatively, this addition of the question to a watched question listing for the user may be performed automatically in response to cognitive evaluations of the features extracted from the question. For example, if it is determined that the question is temporally dependent, e.g., "What is the weather going to be on Saturday?" or "Who has the best batting average this year?", then these questions may be automatically added to the watched question listing for the user that submitted the questions such that they may be updated when the answers to these questions change over time or in response to new or updated content being provided in the corpus 106.

For those questions that are designated to be watched questions, the one or more features of the questions are added to a watched question data structure, stored in a watched question database 130, which is linked to an identifier or profile of the particular user, such as may be maintained in a user profile registry 140. Depending on the particular embodiment, various features of the watched question may be added to the watched question data structure. For example, in one embodiment, the text of each watched question is added. In an embodiment that includes corpora faceting and filtering, the question faceting and filtering criteria that the user may have submitted with the question is added, e.g., the user may specify that the question should only be answered using content from documents within a certain corpus or published after a certain date. Other embodiments may store other information in the watched question data structure which is deemed useful for performing the particular watched question updating implemented in that particular embodiment.

Various metadata about the watched questions may also be stored in the watched question data structure including synonym information, disambiguation information, focus of the question, lexical answer type, or any other features that may have been extracted from the natural language of the question by the QA pipeline 108 mechanisms. In this way, each user of a plurality of users may have their own associated watched question data structure in the database 130 that is checked for an update to the answers of those watched questions when there is a change in the corpus 106. The one or more watched questions stored in the user's watched question data structure in the database 130 are referred to herein as the user's "watched question listing."

In addition to the watched question data structure being associated with the corresponding user's profile or user identifier, the results generated by the QA pipeline 108 when processing the watched question may be stored as one or more entries in the results cache 150. For example, these results may comprise the top M natural language content portions or passages that were used to generate candidate answers to the question, the top N answers to the question that were previously generated by the QA pipeline 108, and/or the like. Thus, for each watched question in each user's watched question listing, a corresponding results cache 150, or portion of the results cache 150 comprising a plurality of entries in the results cache 150, is provided that stores the previous results generated by the QA pipeline 108 for that watched question, and is linked to the watched question data structure in the watched questions database 130.

The results cache entries corresponding to a watched question are used as part of the operations of the illustrative embodiments to determine if changes to the corpus 106 are likely to cause a change in the results generated for the watched question which would require full processing of the watched question by the QA pipeline 108. As mentioned above, and described further hereafter, in some cases the contents of the results cache 150 may be modified and/or flushed depending on the evaluations made by the mechanisms of the illustrative embodiments. Thus, for example, in the case where the results do change, the results may be updated in the results cache 150. In the case where changes to the logical components of the QA pipeline 108 are made, the results cache 150 entries for all watched questions may be flushed such that the newly updated or changed logic of the QA pipeline 108 may be applied to all of the watched questions 130. Similarly, if an update of the question analysis component of QA pipeline 108 is deployed, then any question analysis metadata that have been stored for each watched question in Watched Questions 130 storage is flushed, recomputed with the updated question analysis component the next time the watched question is processed, and then the recomputed watched question metadata are stored in Watched Questions 130 storage.

In operation, in response to a change in the content of the corpus 106 being signaled or otherwise detected by the cognitive system 100 such that the updated or changed content of the corpus 106 is ingested by the cognitive system 100 for annotation and analysis, the watched question processing engine 120 may initiate a watched question processing operation to re-evaluate the watched questions 130 based on the updated corpus 106. As noted above, this process may be very time consuming and resource utilization intensive for large watched questions databases 130, i.e. a large number of users with a large number of these users having their own watched question set comprising one or more watched questions. Thus, as part of the watched question processing of the illustrative embodiments, the watched question processing engine 120 determines which watched questions need to have full processing by the QA pipeline 108, i.e. through all stages of the QA pipeline 108, and which watched questions can have this full processing bypassed at one or more of the stages due to a determination that the changes to the corpus 106 do not materially affect the results that would be generated for the watched question should a full processing be performed. In such a case, the full processing is bypassed and it is determined that the results of the watched question have not changed and no notification of any changed results needs to be sent to the user. If full processing is determined to be needed, then the full processing may be initiated by the QA pipeline 108 with any changed results being notified to the user associated with the watched question and, if appropriate, the results being cached in the results cache 150 in association with the watched question. This process will be described in greater detail hereafter with regard to FIG. 3.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINTJX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 3 is provided only as one example of the processing structure that may be implemented to process a natural language input requesting the operation of a cognitive system to present a response or result to the natural language input.

The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter. Additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500$s$ to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the search stage 340. The search stage 340 logic further comprises primary search logic 342 and candidate answer generation logic 344. The primary search logic 342 performs a search of the corpus or corpora 345, 347 for portions of content that comprise key words or key phrases obtained from the input question during question analysis. Typically, the top N portions of content, e.g., documents, according to the primary search ranking are subjected to further processing, where N is a configurable parameter of the QA pipeline 300. Candidate answers are then generated by the candidate answer generation logic 344 from the N documents found in the primary search, based on heuristics that emphasize high recall of candidate answers. That is, the application of the queries results in the extraction of portions of the corpus of data/information matching the criteria of the particular query. These portions of the corpus are then analyzed and used, during the search stage 340, to generate candidate answers for answering the input question. For any input question, at this stage 340, there may be hundreds of candidate answers generated that may need to be evaluated.

The candidate answers generated at the search stage 340, along with their locations and their containing documents, are then provided to the scoring stage 350 logic, when performs a deep analysis and comparison of the language of the input question and the language of each candidate answer, as well as performs evidence scoring to evaluate the likelihood that the particular candidate answer is a correct answer for the input question. This involves using a plurality of reasoning algorithms, or "scorers", each performing a separate type of analysis of the language of the input question and/or content of the corpus that provides evidence in support of, or not in support of, the candidate answer. These reasoning algorithms, or "scorers", may be generally classified into basic answer scoring 352 and contextual answer scoring 354 logic elements in the depicted example. Each reasoning algorithm generates a score based on the analysis it performs which indicates a measure of relevance of the individual portions of the corpus of data/information extracted by application of the queries as well as a measure of the correctness of the corresponding candidate answer, i.e. a measure of confidence in the candidate answer. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation. These weights may be specified in trained models 372, for example.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. This final confidence merging and ranking 370 may also make use of thresholds and other information stored in trained models 372. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information. Moreover, supporting evidence retrieval may also be performed such that supporting evidence passages may also be output with the final answer(s) and confidence score(s).

As shown in FIG. 3, in accordance with one illustrative embodiment, the QA pipeline 300 is augmented to operate in conjunction with a watched question processing engine 390. While watched question processing engine 390 is shown as a separate element in FIG. 3, it should be appreciated that elements of the engine 390 may be integrated into the pipeline 300 either as additional stages or integral to one or more of the existing stages 310-380 shown in FIG. 3.

As shown in FIG. 3, the watched question processing engine 390 comprises user profiles database 391, watched questions database 392, results cache 393, watched question primary search bypass logic 394, update filter/facet logic 395, watched question pooling logic 396, watched question answer generation bypass logic 397, QA pipeline logic change detection logic 398, and corpus update detection logic 399. It should be appreciated that while the following description will be associated with these various elements of the engine 390 and their various functionalities and/or operations, any other functionalities/operations that are not specifically associated with one or more of these elements 391-399 may be performed by other logic (not shown) of the watched question processing engine 390, such as by a controller, a communications interface, or any other suitable logic for performing such functions/operations.

As discussed above, the watched question processing engine 390 operates to determine if updates to a corpus or corpora 345, 347 (hereafter assumed to be a single corpus for ease of explanation) affect answers previously generated for watched questions such that a change in the answer(s) should be notified to the user that submitted the watched question. Thus, initially, the watched question processing engine 390 needs to know when the corpus 345 has changed, e.g., by a modification to a portion of content already present in the corpus 345 or by addition/removal of content in the corpus 345. The corpus update detection logic 399 detects when an update to the corpus 345 has occurred. The detection may be done in various ways depending on the implementation. For example, the corpus update detection logic 399 may be signaled by the cognitive system 100 when the cognitive system ingests a modified/new portion of the corpus 345. For example, a message could be put on a queue indicating that a corpus update has been completed. At that point, any listeners on the queue, such as the watched question processing engine 390, may treat this as an indication that the corpus 347 or corpora 345 has changed. Another approach may be to poll the corpus to determine the most recent date of ingestion and if this value increases and then stops for a given amount of time, the system may treat this as an indication that an ingestion has completed. In some cases, the system may keep track of ingestions for each of its corpora along with search filters, such that it is possible to bypass watched questions whose processing would involve searching corpora that have not changed.

In response to detecting a change to the corpus 345, the watched question processing engine 390 initiates a watched question processing operation by evaluating each of the watched questions in the watched questions database 392 to determine if the previous answers to the watched questions have changed due to the change in the corpus 345. For ease of explanation, the way in which this evaluation is performed, and the way the mechanisms of the illustrative embodiments determine whether such evaluation may be bypassed or if full processing of a watched question is required, will be described with regard to a single watched question. It should be appreciated that this operation may be repeated for each watched question in the watched questions database 392 for one or more users.

For a watched question in the watched question database 392, the features of the watched question are retrieved from the database 392 including links to entries in the user profiles database 391 and results cache 393. Thus, the watched question features, as well as the user profile of the user that submitted the watched question, and the previous results generated for the watched question by the QA pipeline 300, are retrieved and provided to the watched question primary bypass logic 394.

The watched question primary search bypass logic 394 performs operations to determine whether the operations of the QA pipeline 300 starting with the primary search logic 342 of the search stage 340, and including the subsequent downstream stages of the QA pipeline 300, may be bypassed since the update to the corpus does not materially affect the answers that would be generated for the watched question. For a given watched question, the watched question primary search bypass logic 394 performs a comparative analysis of a cognitive system pipeline under two invocations. One invocation includes the entire (or "full") corpus 345, while the second invocation excludes the updated portions of the corpus 345. The comparison of the two invocations indicates whether or not it is necessary to execute downstream stage operations of the QA pipeline 340 or if such stages 340-380 may be bypassed. As a result, the processing load of watched questions is effectively reduced, which mitigates the possibility of reaching a compute power budget limit or a functionally expressed limit for watched question processing.

In a first aspect of the illustrative embodiments, the watched question primary search bypass logic 394 determines whether a primary search on a set of key terms/phrases and/or other features extracted from a watched question returns a different set of M highest ranked documents between when the updated documents in the corpus, i.e., the corpus update documents, are included and when they are excluded, where M is an integer number determined based on the desired implementation. For example, as noted above, R1 denotes the list of primary search results from the corpus 345 prior to the corpus updates being applied, i.e. excluding corpus update documents, and R2 denotes the list of primary search results from the full corpus including the corpus update documents.

Thus, the watched question may be provided to the QA pipeline 300 as an input question for processing at least by the primary search logic 342 so as to generate the results R2 while the results R1 may be retrieved from the results cache 393 entries for the watched question or may be obtained by performing a primary search only on the portions of the corpus 345 which existed primary to the update to the corpus 345. Since the candidate answers are obtained from the M highest ranked documents of the primary search, if R2 is equal to R1, then the processing of the watched question can be concluded at the primary search logic 342 of the QA pipeline 300 because there will be no change to the answers, i.e. the M highest ranked documents have not changed and thus, the N top ranked answers will not change. Thus, even though a change has been made to the corpus 345, there is no need to perform full evaluation of the watched question through the entire QA pipeline 300 since the result will not change, i.e. the same top N answers will be returned. As a result, the processing of the watched question by further downstream stages and logic of the QA pipeline, e.g., candidate answer generation 344 of search stage 340 and the further downstream stages 350-380, may be avoided and the processing time and resources that would have been used for such operations may be saved.

If it is determined that R2 does not equal R1, then a full processing of the watched question may continue through the candidate answer generation 344 and downstream stages 350-380. The newly generated answer(s) for the watched question may then be sent to the user associated with the watched question, such as by using contact information specified in the user profile, so as to notify the user of an update to the answer(s) to their previously submitted question. The primary search results that are generated may also be used to update the entries in the results cache 393 for the watched question, i.e. stored as the new R1.

As previously mentioned above, an optimization of this watched question primary search bypass logic 394 is to perform date/time filter and/or facet based identification of portions of the corpus 345 that have been changed. For example, the update filter/facet logic 395 may operate to distinguish pre-existing portions of the corpus 345 from corpus updates, i.e. corpus update documents, based on date or date/time filtering. That is, any portions of the corpus 345 that have ingestion date/time metadata associated with them that are prior to a last corpus update date/time will be considered to be pre-existing portions of the corpus 345 while other portions of the corpus 345 that have ingestion date/time metadata that are equal to or after the last corpus update date/time will be considered new portions of the corpus, for purposes of identifying R1 and R2 above.

As another optimization that may be applied in some illustrative embodiments, the update filter/facet logic 395 may provide a post-processing operation for watched question processing that assigns a metadata facet "X" with a value indicative of whether or not the portion of the corpus 345 is a previously existing portion of the corpus, i.e. X=EXISTING. During watched question processing, all pre-existing corpus documents will have a facet X value of EXISTING, and all newly ingested corpus update documents will not have this facet X value, e.g., X may be set to 1 if it is EXISTING and X may be set to 0 if it is not EXISTING. Thus, R1 may be associated with documents of the corpus whose X value is EXISTING while R2 is produced from all of the documents regardless of X value.

In a further optimization as previously mentioned above that may be implemented in some illustrative embodiments, watched question pooling logic 396 may be provided for pooling similar watched questions, across a plurality of different users, together so as to be able to perform watched question processing for groups of similar watched questions in a more efficient manner. In particular, for each watched question, important features, e.g., key words, key phrases, lexical answer types, focus, etc., that are extracted during question parsing and analysis, such as via stages 310-320, may be cached in association with the watched question pooling logic 396 or stored as part of the entries in the watched questions database 392. Watched questions across users that have similar extracted features for the primary search, i.e. similar questions being asked by a plurality of different users, may be associated with each other in a same watched question pool or group such that the primary search for watched question processing may be performed once for each watched question pool or group, rather than for each watched question. Thus, when a watched question is retrieved from the watched questions database 392 for processing, the results of the processing may be applied to each watched question in the watched question pool. Thus, the watched question bypass logic 394 for subsequent watched questions in the same watched question pool or group may be bypassed. Such an optimization may be performed in addition to one or more of the other optimizations and operations described herein for improving the efficiency by which watched question processing is performed.

In yet another optimization, the watched question primary search bypass logic 394 may perform an update constrained analysis such that that a preliminary search that is constrained to only corpus update documents is performed. For example, a modified form of the faceting supported by the update filter/facet logic 395 may be used to identify the portions of the corpus 345 that are directed to corpus update documents. In such a case, the facet X for a corpus update document may be set to a NEW value during an initial ingestion of the corpus update document by the cognitive system, and then changed to a value of EXISTING after the watched question processing is performed by the watched question processing engine 390, with this update being performed by the update filter/facet logic 395, for example. If the preliminary search of only the corpus update documents produces no results, i.e. the corpus update documents do not provide any candidate answers for the watched question, then the optimized search phase 340, as discussed above, may be bypassed along with the rest of the processing by the additional downstream stages 350-380 of the QA pipeline 300. This bypass is appropriate because the updates to the corpus did not contain any documents that would add to the results of R2 above, i.e. primary search on a full corpus, relative to the results of R1, i.e. a primary search that excludes the corpus update documents.

In some illustrative embodiments, alternative to, or in addition to, one or more of the primary search mechanisms described above, watched question answer generation bypass logic 397 is provided for optimizing candidate answer generation as performed by candidate answer generation logic 344 of the search stage 340. Again assume that A1 denotes the candidate answer list prior to, or exclusive of, corpus update documents, and A2 denotes the candidate answer list generated from the full corpus including the corpus update documents. The candidate answers in A1 may be retrieved from the results cache 393, for example, while A2 may be generated by the candidate answer generation logic 344. If A2 does not differ from A1 for a given watched question, then the remaining stages 350-380 of the cognitive system pipeline can be bypassed since the candidate answers have not changed based on the corpus update.

It should also be appreciated that mechanisms similar to those above with regard to the primary search optimizations may be applied to embodiments in which candidate answer generation is optimized by the watched question answer generation bypass logic 397 as well. For example, result list caching may be utilized such that A1 can be obtained from the results cache 393 and when A2 differs from A1, then A2 can be used to update the cached A1 in the results cache 393. For another example, watched question pooling may be performed based on similarity of question features used as input to candidate answer generation.

As another example, update constrained analysis as discussed above may also be used with candidate answer generation optimization performed by the watched question answer generation bypass logic 397 as well. Specifically, the primary search logic 342 operation of the search stage 340 may be constrained to corpus update documents only in the updated corpus 345. Then, if there are no documents are produced as sources of candidate answers, or if there are no candidate answers generated from any documents produced by the primary search, then the optimized candidate answer generation logic 344 may be bypassed along with the remaining downstream stages 350-380 of the QA pipeline 300 processing for watched questions because the corpus update did not contain any documents that would add candidate answers to A2 relative to A1.

In still other illustrative embodiments, the above processing of watched questions may also be modified based on QA pipeline component version updates as identified by the QA pipeline logic change detection logic 398. For example, if an annotator, scoring algorithm, ranking algorithm, trained model, or any other component of the QA pipeline changes that would affect the way in which candidate answers to watched questions may be generated, the final N top ranked answers produced based on a full corpus 345 may differ from the final N top ranked answered produced from the corpus 345 excluding corpus update documents, even if the results of the primary search did not change, i.e. R2 equals R1, or the results of the candidate answer generation did not change, i.e. A2 equals A1. When a component of the QA pipeline component is detected to have been updated or changed in any way by the QA pipeline logic change detection logic 398, the results cache 393 may be cleared so as to require a full processing (all stages) of the watched questions in the watched questions database 392 by the QA pipeline 300. The QA pipe logic change detection logic 398 may determine whether an element of the pipeline 300 has been updated in various ways. One approach may be to set a marker bit associated with watched questions in the watched questions database 392 indicating that an element of the pipeline 300 has been updated, where this marker bit may be set as part of a deployment operation when an updated element is deployed to the pipeline 300. In another approach, version tracking mechanisms may be implemented to keep track of the versions of the elements that make up the pipeline 300. In some cases, this versioning mechanism may store version information in the entries of the watched questions database 392 indicating the version of the pipeline 300 or even individual elements of the pipeline 300 that were used to determine the previous answer to the watched question.

Thus, the illustrative embodiments provide mechanisms for bypassing full processing of watched questions through a QA pipeline when a determination indicates that the candidate answers for the questions are not likely to change due to the changes performed to the corpus. In this way, the processing time and resources for processing watched questions are reduced.

Figure 4:
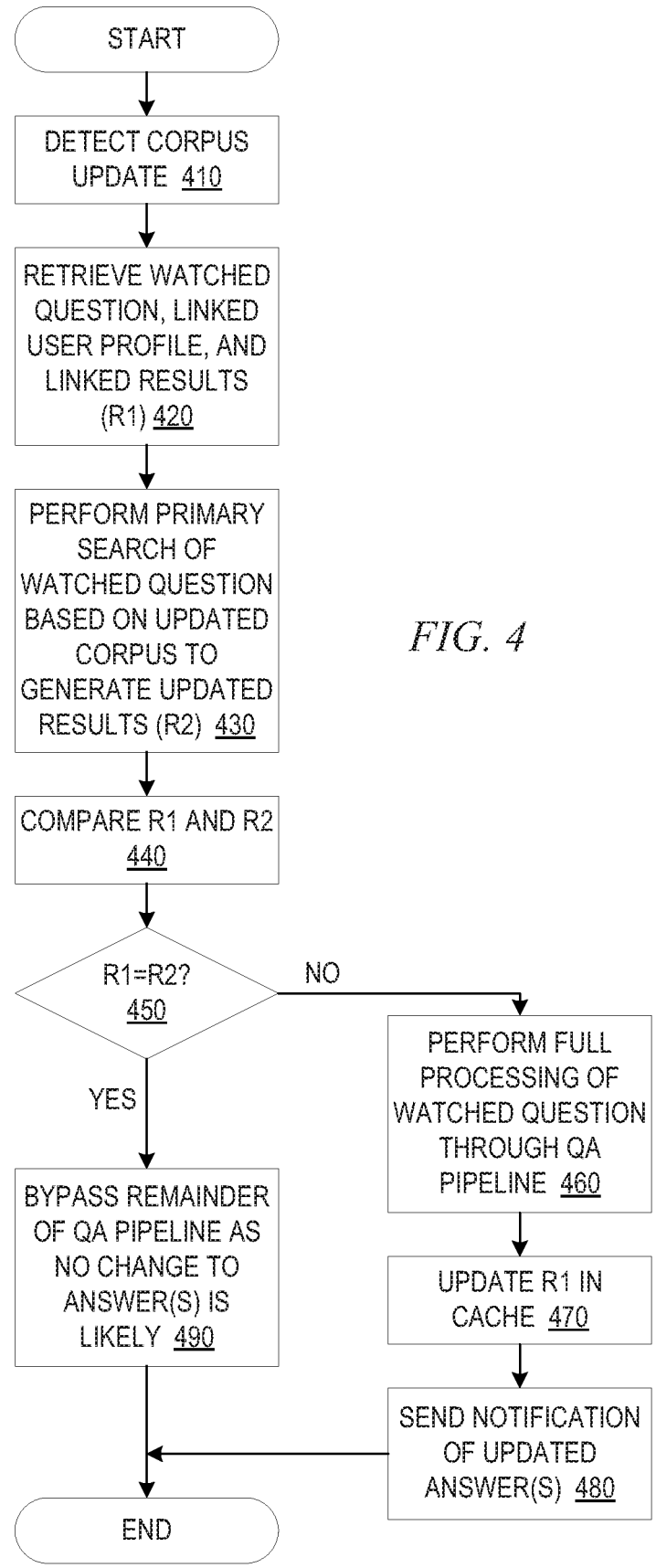
FIG. 4 is a flowchart outlining an example operation for performing watched question processing and QA pipeline bypassing in accordance with one illustrative embodiment.

FIG. 4 is a flowchart outlining an example operation for performing watched question processing and QA pipeline bypassing in accordance with one illustrative embodiment. The operation outlined in FIG. 4 may be performed by a watched question processing engine 390 in FIG. 3, for example. The operation shown in FIG. 4 is described with regard to a single watched question processing. It should be appreciated that the operation outlined in FIG. 4 may be repeated for a plurality of watched questions.

As shown in FIG. 4, the operation starts by detecting an update to the corpus such that watched question processing should be initiated (step 410). The watched question is retrieved along with the linked user profile and cached results if any (step 420). As noted above, the cache, depending on the particular embodiment, may store results (R1) which comprise the top M portions of the corpus from which candidate answers may be generated and/or the top N candidate answers (A1) generated from a previous processing of the watched question. In embodiments where checks are made to determine if the corpus update documents cause a change in the top M documents returned for candidate answer generation are performed, the results R1 are utilized. In embodiments where checks are made to determine if the corpus update documents cause a change in the top N candidate answers generated are performed, the candidate answers listing A1 is utilized.

A primary search of the watched question based on the updated corpus, i.e. the corpus comprising both the previously existing documents and the corpus update documents, is performed to generate updated results R2 (step 430). The newly generated updated results, i.e. the newly generated top M documents R2, are compared (step 440) to the previously existing top M documents R1 to determine if the two sets are equal (step 450). If R1 does not equal R2, i.e. there is at least one difference between the top M documents returned when performing the primary search, then a full processing of the watched question through the QA pipeline is performed (step 460). The results R2 are used to update the R1 results cache (step 470) and a notification is sent to the user, based on the user contact information in the linked user profile, to inform the user of changes in the answers to the watched question (step 480). If R1 does equal R2, then the updates to the corpus do not materially affect the answers to the watched question and thus, the remainder of the QA pipeline processing may be bypassed (step 490). The operation then terminates.

It should be appreciated that while not shown in FIG. 4, in some embodiments, candidate answer listings are checked, i.e. A1 is checked with A2 to see if there are any differences. In such embodiments, additional steps used to generate A2, i.e. the top N candidate answers generated based on the top M documents returned from the primary search, may be included in FIG. 4 and/or replace steps in FIG. 4 such that a similar operation is performed with regard to the candidate answer listings A1 and A2.

As noted above, optimizations based on filtering based on date/time metadata of documents in the corpus or faceting may be used to assist with the generation of R1, and/or A1. That is, in embodiments where a results cache is not employed for the watched questions, two separate invocations of the primary search and/or candidate answer generation mechanisms of the QA pipeline may be required in which one invocation operates on only the pre-existing documents in the corpus and the other invocation operates on the full corpus comprising the pre-existing documents and the corpus update documents. Thus, filtering or faceting may be used to distinguish the two portions of the corpus so that an appropriate sub-portion of the corpus corresponding to the pre-existing documents may be identified and used to generate R1 and/or A1.

Moreover, it should be appreciated that the operation outlined in FIG. 4 may be performed with regard to a representative watched question of a watched question pool or group of similar watched questions. That is, watched questions may be grouped based on a similarity comparison of watched question features such that watched question pools are generated. For a watched question pool, a representative watched question may be selected and the operation outlined in FIG. 4 may be employed to process the watched question. The bypass logic (step 440) and cache update (step 470) results of this processing may then be associated with each of the watched questions in the watched question pool. Thus, for example, processing of the other watched questions in the pool may be bypassed if it is determined that R1=R2 or A1=A2, depending on the embodiment. However, if full processing of the representative watched question is performed, then full processing (step 460) and update notification (step 480) must be performed for each of the watched questions in the watched question pool.

Figure 5:
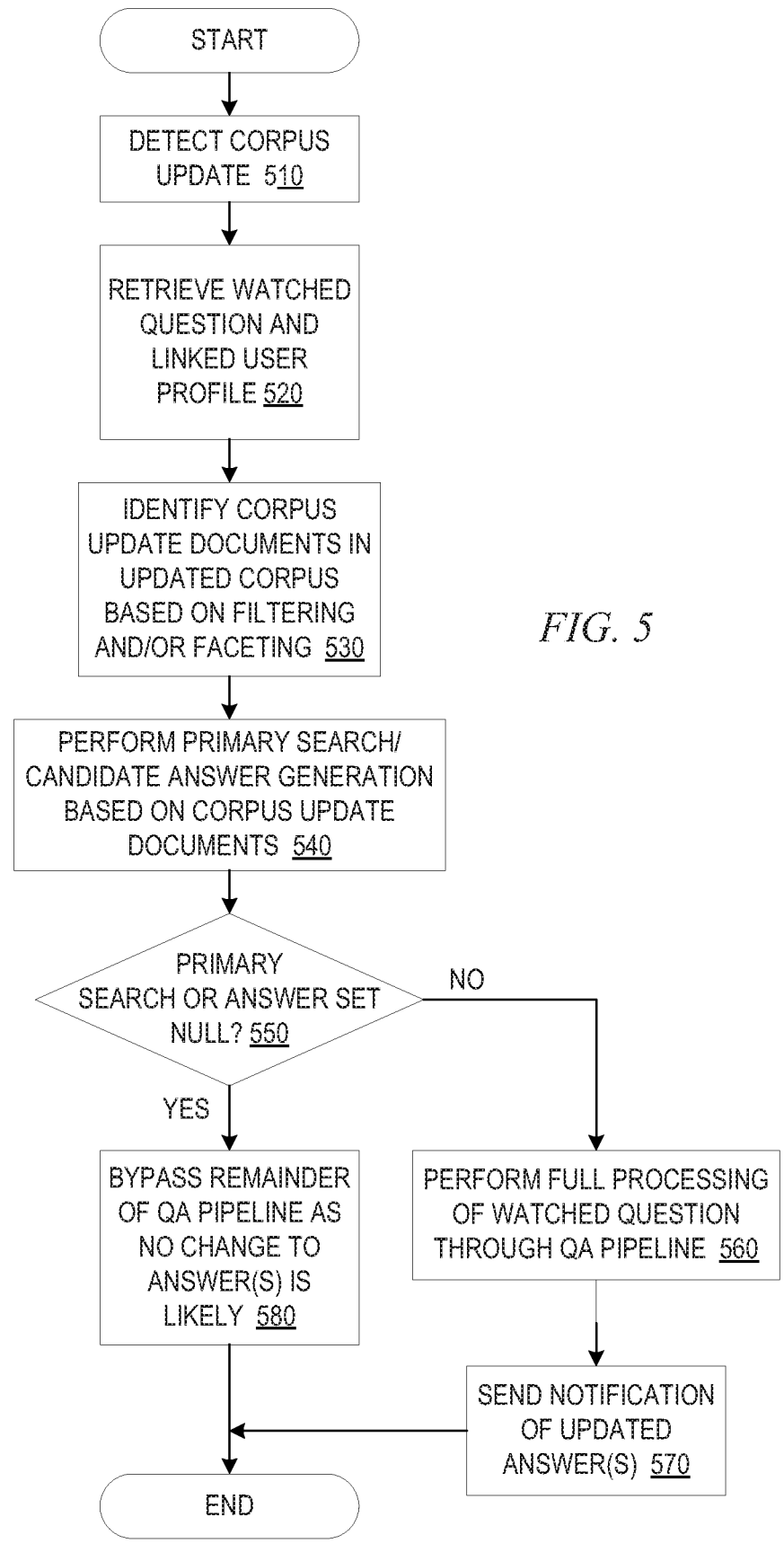
FIG. 5 is a flowchart outlining an example operation for performing update constrained analysis based QA pipeline bypassing in accordance with one illustrative embodiment.

FIG. 5 is a flowchart outlining an example operation for performing update constrained analysis based QA pipeline bypassing in accordance with one illustrative embodiment. The operation outlined in FIG. 5 may be performed by a watched question processing engine 390 in FIG. 3, for example. The operation shown in FIG. 5 is described with regard to a single watched question processing. It should be appreciated that the operation outlined in FIG. 5 may be repeated for a plurality of watched questions and/or may be utilized with the watched question pooling mechanisms described previously such that the watched question processed may have its results applied to a plurality of watched questions in a pool/group with which it is associated.

As shown in FIG. 5, the operation starts by detecting a corpus update which initiates watched question processing (step 510). A watched question is retrieved with its linked user profile (step 520). A portion of the corpus that corresponds to the corpus update documents is identified by either date/time filtering or faceting (step 530), which were described previously as alternative embodiments for obtaining R1 and A1. A primary search to generate the top M documents (R2') and/or candidate answer generation to generate the top candidate answer list (A2'), depending on the particular embodiment, is performed based on the corpus updated documents (step 540). A determination is then made as to whether the particular primary search or candidate answer sets are null or not (step 550). That is, a determination is made as to whether the primary search result R2' includes any of the corpus update documents that should be included in R2 or whether any candidate answers are generated into list A2' from the corpus update documents that should be included in A2.

If the R2' or A2' sets are not empty, i.e. not null, then the corpus update documents may affect the candidate answers generated for the watched question and thus, full processing of the watched question may be performed through the QA pipeline (step 560). A notification is sent to the user to indicate an update in the answer(s) generated for the watched question (step 570). If the R2' or A2' sets are empty, i.e. null, then no changes to the answers previously generated for the watched question are likely based on the corpus update documents and thus, the remainder of the QA pipeline processing of the watched question may be bypassed (step 580). The operation then terminates. It should be appreciated that the optimizations mentioned previously may also be applied to embodiments implementing the update constrained analysis outlined in FIG. 5 as well. For example, it should be appreciated that full processing of the watched question (step 560) and update notification (step 570) may be replaced by a modified set of operations. For example, a modified set of operations, such as is shown in FIG. 4, may be implemented in which step 410 may be skipped, and step 420 may comprise only retrieving linked results (R1).

Moreover, while not shown in a separate flowchart herein, the operations for identifying a change in the QA pipeline components may be utilized with any of the other embodiments such that if there is a change to a QA pipeline component, the results cache is flushed which causes all watched questions to be fully processed by the QA pipeline. This is because the determination in step 450 will result in inequality determination. Furthermore, in other embodiments in which update constrained analysis is performed in accordance with FIG. 5, this processing may be disabled if there is no content for the watched question in the results cache.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to cause the processor to implement the method, comprising:
    detecting, by the data processing system, a change in content of electronic documents in a corpus of electronic documents;
    retrieving, by the data processing system, a watched question from a watched question database, wherein the watched question is a question previously processed by a question answering pipeline of the data processing system and for which monitoring is performed to identify changes to previously generated answers for the watched question;
    determining, by the data processing system, whether full processing of the watched question through the question answering pipeline is to be bypassed when performing watched question processing in response to the detected change in content of the electronic documents in the corpus;
    in response to determining that full processing of the watched question through the question answering pipeline is to be bypassed:
        bypassing, by the data processing system, one or more stages of processing of the question answering pipeline, and
        returning, by the data processing system, a result of the watched question processing indicating that no changes to the previously generated answers are caused by the change in the content of the electronic documents in the corpus; and
    in response to determining that full processing of the watched question through the question answering pipeline is not to be bypassed:
        performing full processing of the watched question through all stages of the question answering pipeline to generate one or more new answers to the watched question based on the updated corpus;
    wherein determining whether full processing of the watched question through the question answering pipeline is to be bypassed comprises:
        obtaining first results comprising a first predetermined number of highest ranked documents returned by a primary search of the corpus prior to the change in content of electronic documents in the corpus;
        obtaining second results comprising a second predetermined number of highest ranked documents returned by a primary search of the updated corpus after the change in content of electronic documents in the corpus;
        comparing the first results to the second results; and
        determining whether full processing of the watched question through the question answering pipeline is to be bypassed based on results of the comparison.

2. The method of claim 1, further comprising determining that full processing of the watched question through the question answer pipeline is to be bypassed in response to results of the comparison indicating that the first results are equivalent to the second results.

3. The method of claim 1, wherein the first results are obtained from a results cache, where the first results are results of a prior full processing of the watched question through the question answer pipeline.

4. The method of claim 1, wherein obtaining second results comprising a second predetermined number of highest ranked documents returned by a primary search of the updated corpus after the change in content of electronic documents in the corpus comprises obtaining the second results based on processing of only the electronic documents in the corpus whose content was changed.

5. The method of claim 4, wherein obtaining second results further comprises distinguishing changed portions of the corpus from previously existing portions of the corpus based on date filtering, and wherein determining whether full processing of the watched question through the question answering pipeline is to be bypassed comprises determining whether the changed portions generate a change in previously generated answers to the watched question.

6. The method of claim 4, wherein obtaining second results further comprises distinguishing changed portions of the corpus from previously existing portions of the corpus based on a metadata facet value associated with each of the documents in the corpus indicating whether or not a corresponding document in the corpus is a changed or new document, or a previously existing document, and wherein determining whether full processing of the watched question through the question answering pipeline is to be bypassed comprises determining whether the changed portions generate a change in previously generated answers to the watched question.

7. The method of claim 1, further comprising:
    performing, by the data processing system, an operation that groups watched questions having at least one similar characteristic into a watched question pool;

selecting, by a data processing system, from the watched question pool, a watched question as a representative watched question of the watched question pool; and replicating a result of processing the representative watched question by the data processing system to other watched questions in the watched question pool.

8. The method of claim 1, further comprising:

determining, by the data processing system, whether a component of the question answering pipeline has been updated; and in response to determining that a component of the question answering pipeline has been updated, marking, by the data processing system, all watched questions in the watched question database as requiring full processing through the question answering pipeline.

9. A computer program product comprising a computer readable storage medium having a computer readable program stored therein, wherein the computer readable program, when executed on a data processing system, causes the data processing system to:

detect a change in content of electronic documents in a corpus of electronic documents;

retrieve a watched question from a watched question database, wherein the watched question is a question previously processed by a question answering pipeline of the data processing system and for which monitoring is performed to identify changes to previously generated answers for the watched question;

determine whether full processing of the watched question through the question answering pipeline is to be bypassed when performing watched question processing in response to the detected change in content of the electronic documents in the corpus;

in response to determining that full processing of the watched question through the question answering pipeline is to be bypassed:
  bypass one or more stages of processing of the question answering pipeline; and
  return a result of the watched question processing indicating that no changes to the previously generated answers are caused by the change in the content of the electronic documents in the corpus; and in response to determining that full processing of the watched question through the question answering pipeline is not to be bypassed:
  perform full processing of the watched question through all stages of the question answering pipeline to generate one or more new answers to the watched question based on the updated corpus;

wherein determining whether full processing of the watched question through the question answering pipeline is to be bypassed comprises:
  obtaining first results comprising a first predetermined number of highest ranked documents returned by a primary search of the corpus prior to the change in content of electronic documents in the corpus;
  obtaining second results comprising a second predetermined number of highest ranked documents returned by a primary search of the updated corpus after the change in content of electronic documents in the corpus;
  comparing the first results to the second results; and
  determining whether full processing of the watched question through the question answering pipeline is to be bypassed based on results of the comparison.

10. The computer program product of claim 9, wherein the computer readable program further causes the data processing system to determine that full processing of the watched question through the question answer pipeline is to be bypassed in response to results of the comparison indicating that the first results are equivalent to the second results.

11. The computer program product of claim 9, wherein the first results are obtained from a results cache, where the first results are results of a prior full processing of the watched question through the question answer pipeline.

12. The computer program product of claim 9, wherein the computer readable program further causes the data processing system to obtain second results comprising a second predetermined number of highest ranked documents returned by a primary search of the updated corpus after the change in content of electronic documents in the corpus at least by obtaining the second results based on processing of only the electronic documents in the corpus whose content was changed.

13. The computer program product of claim 12, wherein the computer readable program further causes the data processing system to obtain second results at least by distinguishing changed portions of the corpus from previously existing portions of the corpus based on date filtering, and wherein the computer readable program further causes the data processing system to determine whether full processing of the watched question through the question answering pipeline is to be bypassed at least by determining whether the changed portions generate a change in previously generated answers to the watched question.

14. The computer program product of claim 12, wherein the computer readable program further causes the data processing system to obtain second results at least by distinguishing changed portions of the corpus from previously existing portions of the corpus based on a metadata facet value associated with each of the documents in the corpus indicating whether or not a corresponding document in the corpus is a changed or new document, or a previously existing document, and wherein the computer readable program further causes the data processing system to determine whether full processing of the watched question through the question answering pipeline is to be bypassed at least by determining whether the changed portions generate a change in previously generated answers to the watched question.

15. The computer program product of claim 9, wherein the computer readable program further causes the data processing system to:

perform an operation that groups watched questions having at least one similar characteristic into a watched question pool;

select, from the watched question pool, a watched question as a representative watched question of the watched question pool; and replicate a result of processing the representative watched question by the data processing system to other watched questions in the watched question pool.

16. The computer program product of claim 9, wherein the computer readable program further causes the data processing system to:

determine whether a component of the question answering pipeline has been updated; and in response to determining that a component of the question answering pipeline has been updated, mark all watched questions as requiring full processing through the question answering pipeline.

17. An apparatus comprising:

a processor; and a memory coupled to the processor, wherein the memory comprises instructions which, when executed by the processor, cause the processor to:

detect a change in content of electronic documents in a corpus of electronic documents;

retrieve a watched question from a watched question database, wherein the watched question is a question previously processed by a question answering pipeline of the data processing system and for which monitoring is performed to identify changes to previously generated answers for the watched question;

determine whether full processing of the watched question through the question answering pipeline is to be bypassed when performing watched question processing in response to the detected change in content of the electronic documents in the corpus;

in response to determining that full processing of the watched question through the question answering pipeline is to be bypassed:

bypass one or more stages of processing of the question answering pipeline; and return a result of the watched question processing indicating that no changes to the previously generated answers are caused by the change in the content of the electronic documents in the corpus; and in response to determining that full processing of the watched question through the question answering pipeline is not to be bypassed:

perform full processing of the watched question through all stages of the question answering pipeline to generate one or more new answers to the watched question based on the updated corpus;

wherein determining whether full processing of the watched question through the question answering pipeline is to be bypassed comprises:

obtaining first results comprising a first predetermined number of highest ranked documents returned by a primary search of the corpus prior to the change in content of electronic documents in the corpus;

obtaining second results comprising a second predetermined number of highest ranked documents returned by a primary search of the updated corpus after the change in content of electronic documents in the corpus;

comparing the first results to the second results; and determining whether full processing of the watched question through the question answering pipeline is to be bypassed based on results of the comparison.

* * * * *